US008352922B2

(12) United States Patent
Gray-Donald et al.

(10) Patent No.: US 8,352,922 B2
(45) Date of Patent: Jan. 8, 2013

(54) DATE AND TIME SIMULATION FOR TIME-SENSITIVE APPLICATIONS

(75) Inventors: Trent A. Gray-Donald, Ottawa (CA); Marc Warner Price, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 934 days.

(21) Appl. No.: 12/415,908

(22) Filed: Mar. 31, 2009

(65) Prior Publication Data

US 2010/0250225 A1 Sep. 30, 2010

(51) Int. Cl.
*G06F 9/44* (2006.01)
*G06F 9/45* (2006.01)
(52) U.S. Cl. .................. 717/135; 717/136; 717/141
(58) Field of Classification Search ........... 717/124–144
See application file for complete search history.

(56) References Cited

U.S. PATENT DOCUMENTS

| | | | | |
|---|---|---|---|---|
| 5,287,490 | A * | 2/1994 | Sites | 717/142 |
| 5,551,015 | A * | 8/1996 | Goettelmann et al. | 717/137 |
| 5,613,117 | A * | 3/1997 | Davidson et al. | 717/144 |
| 5,751,982 | A * | 5/1998 | Morley | 712/209 |
| 5,875,334 | A * | 2/1999 | Chow et al. | 717/141 |
| 6,145,121 | A * | 11/2000 | Levy et al. | 717/135 |
| 6,202,201 | B1 * | 3/2001 | Domi | 717/136 |
| 6,226,789 | B1 * | 5/2001 | Tye et al. | 717/138 |
| 6,321,379 | B1 * | 11/2001 | Callahan, II | 717/141 |
| 6,618,737 | B2 * | 9/2003 | Aridor et al. | 1/1 |
| 6,748,583 | B2 * | 6/2004 | Aizenbud-Reshef et al. | 717/127 |
| 6,996,825 | B2 | 2/2006 | Rose et al. | |
| 7,092,866 | B2 | 8/2006 | Rokosz | |
| 7,152,229 | B2 * | 12/2006 | Chong et al. | 717/146 |
| 7,350,194 | B1 * | 3/2008 | Alpern | 717/124 |
| 7,500,225 | B2 * | 3/2009 | Khan et al. | 717/124 |
| 7,543,279 | B2 * | 6/2009 | Ayers et al. | 717/135 |
| 7,624,383 | B2 * | 11/2009 | Barr et al. | 717/135 |
| 7,752,607 | B2 * | 7/2010 | Larab et al. | 717/135 |
| 7,827,531 | B2 * | 11/2010 | Sen et al. | 717/124 |
| 8,234,633 | B2 * | 7/2012 | Schneider et al. | 717/135 |
| 2005/0187930 | A1 | 8/2005 | Subramanian et al. | |
| 2005/0198645 | A1 | 9/2005 | Marr et al. | |

OTHER PUBLICATIONS

Arnold et al, "Stack trace analysis for large scale debugging", IEEE, pp. 1-10, 2007.*
Liu et al, "Stack distance based worst case instruction cache performance anlaysis", ACM SAC, pp. 723-728, 2011.*
Chang, "Static check analysis for Java stack inspection", ACM SIGPLAN, vol. 41 (3), pp. 40-48, 2006.*
Choi et al, "Stack allocation and synchronization optimization for Java using escape analysis", ACM Trans. on Prog. Lang. 7 Sys. vol. 25, No. 6, pp. 876-910, 2003.*

* cited by examiner

*Primary Examiner* — Anil Khatri
(74) *Attorney, Agent, or Firm* — Nelson and Nelson; Daniel P. Nelson; Alexis V. Nelson

(57) ABSTRACT

A process for providing a simulated date and/or time to a time-sensitive application is disclosed herein. Such a process may include detecting the invocation of a time handler method configured to retrieve system time. Upon detecting the invocation, the contents of a call stack may be captured and analyzed to determine which requester method initiated the invocation. The process may then determine whether the requester method should receive a real or simulated system time. A real system time may be returned to the requester method in the event it should receive the real system time. A simulated system time may be returned to the requester method in the event it should receive the simulated system time. A corresponding apparatus and computer program product are also disclosed and claimed herein.

11 Claims, 3 Drawing Sheets

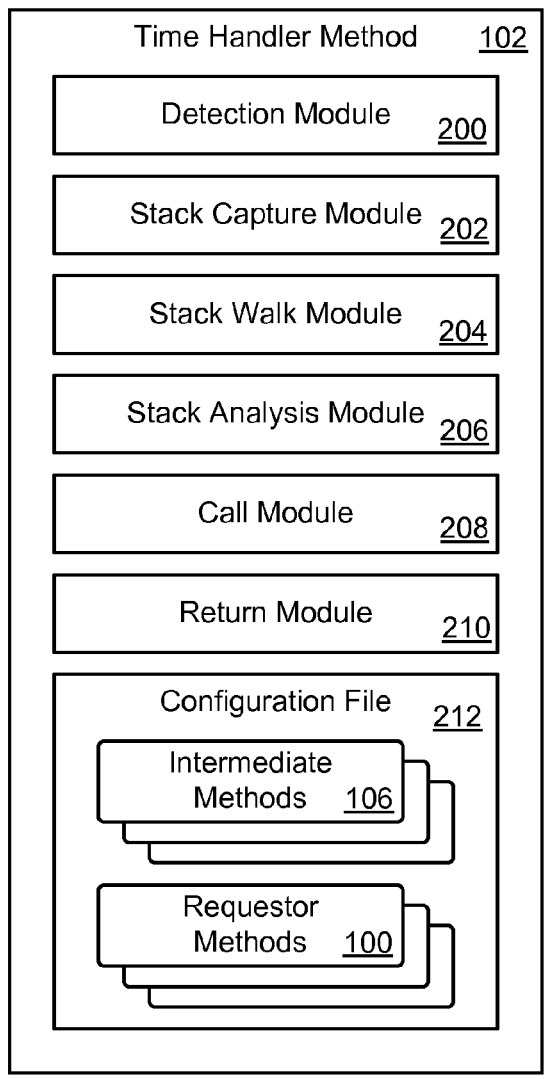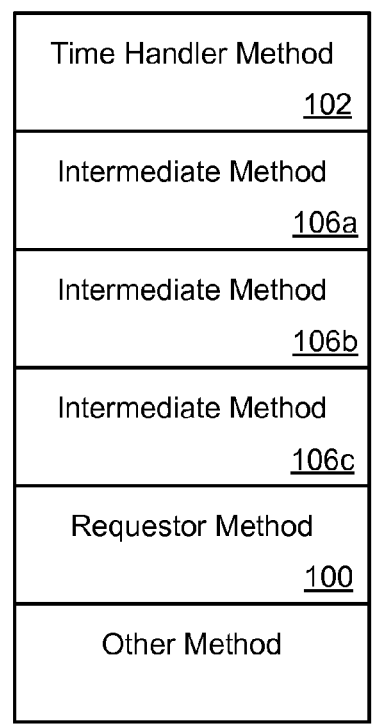
Fig. 2
Fig. 3

DATE AND TIME SIMULATION FOR TIME-SENSITIVE APPLICATIONS

BACKGROUND

1. Field of the Invention

This invention relates to apparatus and processes for testing software, and more particularly to apparatus and processes for performing time and date testing in software applications.

2. Background of the Invention

Many of today's enterprises rely on software applications that employ date- and/or time-sensitive processing logic. As an example, utility companies may employ complicated business logic when billing their customers. Such business logic, for example, may take into account that subsidies for electricity are in effect during certain dates and/or times but not during other dates and/or times. Similarly, companies that sell merchandise may charge a different amount of tax based on laws that are in effect at the date/time the merchandise is purchased. In these and other cases, proper time and date handling is critical to application reliability. Unexpected behavior may have serious implications, including high cost, significant system downtime, loss of customers, or the like.

Time and date testing generally involves injecting specific dates and/or times into software applications and checking the results. In the z/OS environment, several programming languages have tools to enable this type of time and date testing. Unfortunately, these tools do not work with Java™ applications as the underlying approach of these tools is unsuitable for the Java™ environment (the term "Java" is a registered trademark which will be referred to hereinafter as simply "Java" or "java"). More specifically, the Java programming model makes it difficult to discriminate between applications that should receive a simulated time and those that must receive a real time. This differs from other programming languages where applications may directly call the operating system for system time, thereby making it easier to intercept and return a simulated time.

The alternative to using testing software is to manually change the system time to a desired simulated time. One drawback of this approach is that it makes it difficult to achieve a desired level granularity, as it is virtually impossible to force precise boundary times down to the millisecond when manually changing the system time. Another drawback is scope, since the simulated time is seen across the entire computing system which may be running other applications that need to see the real time. Other drawbacks include lack of automation (cannot be scripted into easy nightly regression buckets); speed (manually changing the time is time-consuming); and coverage (because of the speed, the number of tests that can be conducted is limited).

In view of the foregoing, what are needed are apparatus and processes to perform time and date testing in environments such as the Java environment. Ideally, such apparatus and processes would be able to discriminate between applications, thereby providing a real system time to certain applications, while providing a simulated system time to other applications.

SUMMARY

The invention has been developed in response to the present state of the art and, in particular, in response to the problems and needs in the art that have not yet been fully solved by currently available apparatus and processes. Accordingly, the invention has been developed to provide improved apparatus and processes for providing a simulated date and/or time to a time-sensitive application. The features and advantages of the invention will become more fully apparent from the following description and appended claims, or may be learned by practice of the invention as set forth hereinafter.

Consistent with the foregoing, a process for providing a simulated date and/or time to a time-sensitive application is disclosed herein. In one embodiment, such a process may include detecting the invocation of a time handler method configured to retrieve the system time of a computing system. The computing system may include a call stack listing methods (i.e., procedures or routines) that are currently active in an application. Upon detecting the invocation, the contents of the call stack may be captured and analyzed to determine the requester method that initiated the invocation. The process may then determine whether the requester method should receive a real or simulated system time. A real system time may be returned in the event the requester method needs the real system time. Similarly, a simulated system time may be returned in the event the requester method needs the simulated system time.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 2 is a high-level block diagram showing one embodiment of a time handler method in accordance with the invention;

FIG. 3 is a high-level block diagram showing one example of a call stack; and

DETAILED DESCRIPTION

Figure 1:
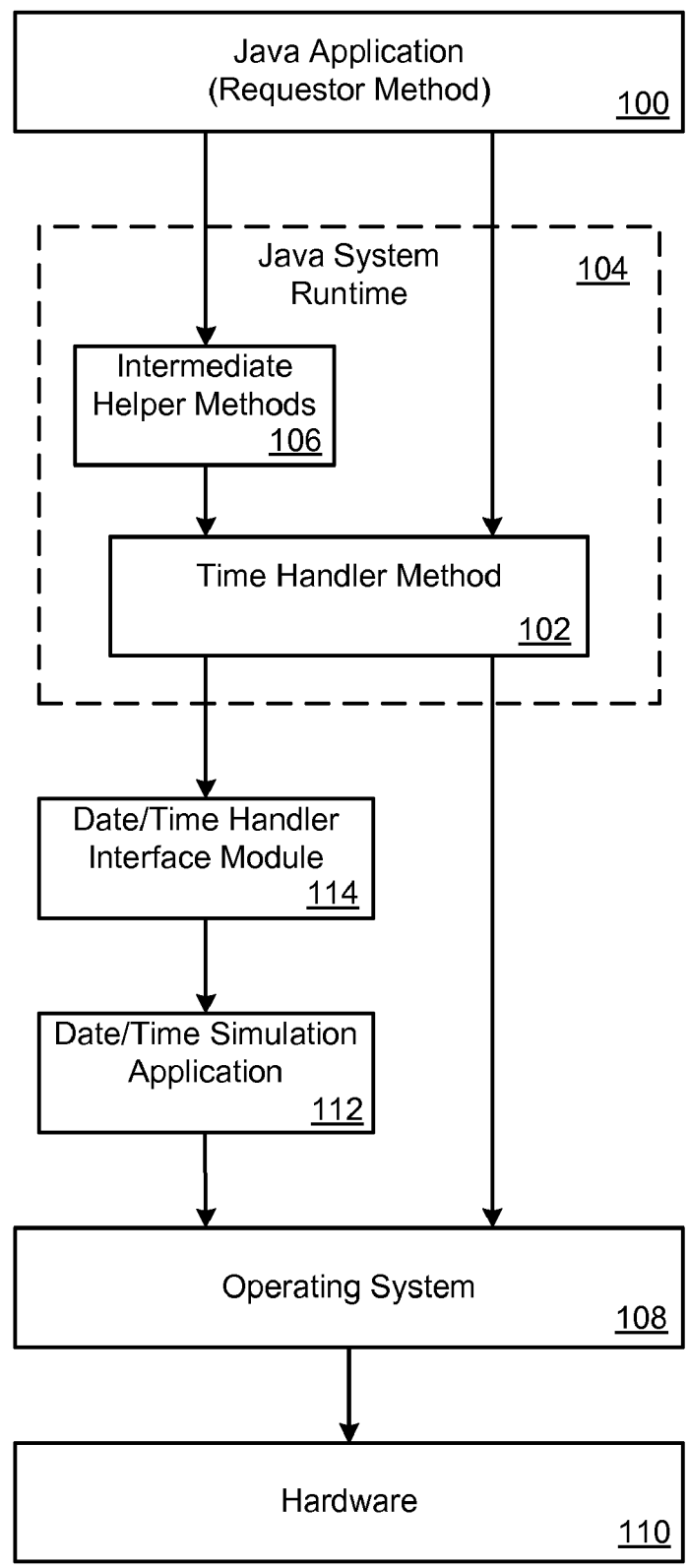
FIG. 1 is a high-level block diagram showing one embodiment of a system in accordance with the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, process, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer program product embodied in any tangible medium of expression having computer-usable program code stored in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of processes, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, as mentioned, many time and date simulation tools do not work with Java applications 100 because the underlying approach of these tools is unsuitable for the Java environment. This is at least partly due to the differences in the Java programming model from other programming models and the level of control a user has in the Java environment. The present inventors have worked with various existing time and date simulation tools and believe that these tools cannot be adapted to work in the Java environment. The fundamental problem is that all Java programs use a single function (the "System.currentTimeMillis( )" method) to request system time, and typically do so via many different helper routines, thereby making it difficult to determine who the "real" caller is. This situation makes it very difficult to determine which applications should receive the real system time and which applications should receive a simulated system time for testing purposes. This determination is important as there are various Java applications (e.g., Java middleware, internal subsystems, or the like) that must see the real system time, while other Java applications may receive a simulated system time for time and date testing purposes. Serious errors and failures may occur if certain Java applications receive a "fake" (i.e., simulated) system time.

As shown in FIG. 1, all or most Java applications 100 may retrieve system time using a common time handler method 102 (i.e., the "System.currentTimeMillis( )" method of the System class) running in the Java system runtime 104. The Java application 100 may call the time handler method 102 directly, but is more likely to call the time handler method 102 via one or more intermediate helper methods 106. These helper methods 106 may manipulate or present the time in some desired format. For example, the time handler method 102 may provide the system time in the form of a raw number, whereas the intermediate helper method 106 may use this raw number to calculate the date and time using a particular calendar system. Other helper routines 106 may take this date and manipulate it in some manner before it is returned to the application 100. Although providing useful functions, the helper routines 106 may undesirably obscure the "real" caller (i.e., the application 100 or requester method 100 that originated the call), thereby making it difficult to determine which application 100 originally requested the system time.

As known to those of skill in the art, the Java programming language includes dynamically loadable libraries that the Java application 100 can call at runtime. The intermediate helper methods 106 and time handler method 102 may be included in these libraries. These libraries allow code and data to be shared between applications 100 and allow the code to be changed or updated in a modular fashion. Although this programming model provides various advantages, it undesirably makes it more difficult to distinguish between applications 100 that should receive the simulated time and those that should receive the real time.

In selected embodiments in accordance with the invention, a conventional time handler method 102 (e.g., the "System.currentTimeMillis( )" method previously described) may be replaced with a new time handler method 102 in accordance with the invention. As will be described in more detail in association with FIG. 2, this new time handler method 102 may include functionality that enables it to distinguish between applications 100 that should receive a simulated system time and applications 100 that should receive the real system time.

If the time handler method 102 determines that the application 100 should receive the real system time, the time handler method 102 may directly call a service of an operating system 108 (e.g., by invoking a STCK assembler instruction) which may retrieve the real system time from the underlying hardware 110. On the other hand, if the time handler method 102 determines that the application 100 should receive a simulated system time, the time handler method 102 may call a date/time simulation application 112 (by way of a date/time handler interface module 114). In certain embodiments, the date/time simulation application 112 is a conventional date/time simulation application 112 such as IBM's Hourglass or Application Time Facility (ATF) applications 112, although other date/time simulation applications 112 may also be used. In selected embodiments, the application 112 may generate the simulated time by modifying the real system time, which may be retrieved from the operating system 108.

Referring to FIG. 2, in selected embodiments, the time handler method 102 may include one or more of the following modules: a detection module 200, a stack capture module 202, a stack walk module 204, a stack analysis module 206, a call module 208, and a return module 210. The time handler method 102 may also include or reference a configuration file 212. In certain embodiments, the configuration file 212 may store a list of requestor methods 100 that should receive a simulated time. Similarly, in selected embodiments, the configuration file 212 may also store a list of intermediate methods 106 that should be ignored. The intermediate methods 106 may represent "noise" that should be filtered out or ignored in order to locate the requestor methods 100 of interest. The configuration file 212 may be changed or updated, as needed, to modify the applications 100 or requestor methods 100 that should receive a simulated time instead of the real time. In selected embodiments, the configuration file 212 may identify applications 100 or requestor methods 100 that should receive simulated time using package name prefixes (e.g., "com.mycompany.myapp") or other suitable identifiers.

In selected embodiments, a detection module 200 may detect when the time handler method 102 is invoked (e.g., by an intermediate helper module 106 or a requestor method 100). Upon detecting the invocation, a stack capture module 202 may capture the current call stack associated with the running Java application 100. This may provide a list of methods that are currently active. In certain embodiments, the call stack may be captured by creating a new exception type (which will take a snapshot of the call stack) and by using the StackFrame( ) API (which returns a list of elements on the call stack) that is available in Java.

Using the call stack information, the time handler method 102 may determine which requestor method 100 initiated the invocation of the time handler method 102. The time handler method 102 may accomplish this using the stack walk module 204, the stack analysis module 206, and the configuration file 212. The stack walk module 204 may walk the call stack and the stack analysis module 206 may analyze each method in the call stack until a requestor method 100 is reached. Because the analysis module 206 may not know the difference between requestor methods 100 and intermediate methods 106, the configuration file 212 may store a list of intermediate methods 106 and requestor methods 100 for reference by the stack analysis module 206. The stack analysis module 206 may reference this configuration file 212 as it analyzes each element in the call stack. As the stack walk module 204 walks the call stack, the stack analysis module 206 may skip over (or ignore) intermediate methods 106 listed in the configuration file 212 until it reaches a requestor method 100 that is listed in the configuration file 212 or, alternatively, reaches a method that is not listed in the configuration file 212.

Upon encountering a requestor method 100, the stack analysis module 206 may determine whether the requestor method 100 should receive the simulated system time or the real system time (which may be determined by whether the requestor method 100 is listed in the configuration file 212). If the requestor method 100 needs the simulated time (i.e., is listed in the configuration file 212), the call module 208 may request the simulated system time from the date/time simulation application 112 and a return module 210 may return the simulated time to the calling method. This simulated system time may eventually make its way back to the requestor method 100 that initiated the request, although the format of the simulated system time may be modified in some fashion by various intermediate helper methods 106.

On the other hand, if the requestor method 100 needs the real system time (i.e., is not listed in the configuration file 212), the call module 208 may make a call to the operating system 108 (using a STCK assembler instruction or other suitable instruction) to retrieve the real system time and the return module 210 may return the real time to the calling method. This real system time will then make its way back to the requester method 100 by way of any intermediate helper methods 106.

The data stored in the configuration file 212 is presented only by way of example and is not intended to be limiting. For example, in other embodiments, the configuration file 212 may store requester methods 100 that should receive the real system time as opposed to the simulated system time. Thus, upon encountering a requester method 100 in the configuration file 212, the real system time may be returned to the calling method. Similarly, if the requester method 100 is not listed in the configuration file 212, the simulated system time may be returned to the calling method. Other variations are also possible and within the scope of the invention.

Referring to FIG. 3, one example of a call stack 300 is illustrated to show the function of the time handler method 102. As shown, when the time handler method 102 is invoked, the time handler method 102 may be the topmost element in the call stack 300. The requester method 100 that initiated the call to the time handler method 102 may reside some distance down the call stack 300. In most cases, the requester method 100 will be separated from the time handler method 102 by one or more intermediate methods 106a-b.

Using the logic described in association with FIG. 2, the stack walk module 204 may walk the call stack 300, starting from the time handler method 102, until it encounters the requester method 100. As described above, the time handler method 102 is able to distinguish between intermediate methods 106a-c and the requester method 100 using information stored in the configuration file 212. Upon encountering the requester method 100, the time handler method 102 is able to determine whether a real time or simulated time should be returned to the requester method 100 based on the information that is stored in the configuration file 212.

Figure 4:
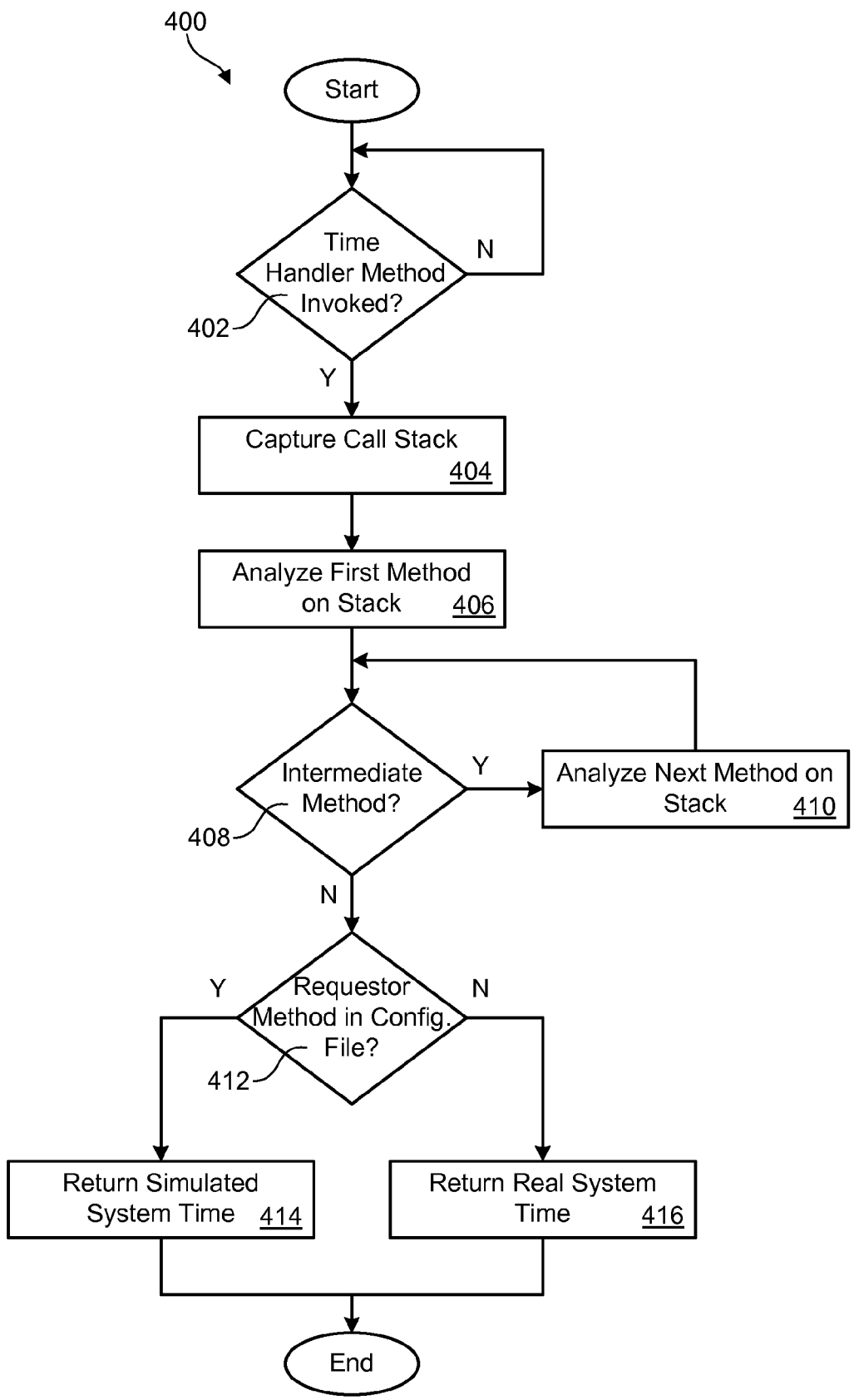
FIG. 4 is a flow chart showing one embodiment of a process for providing a simulated date and/or time to a time-sensitive application.

Referring to FIG. 4, one embodiment of a process 400 for providing a simulated date and/or time to a time-sensitive application is illustrated. The process 400 may begin by determining 402 whether the time handler method 102 has been invoked. If it has been invoked, the process 400 may then capture 404 the call stack and analyze 406 the first method (after the time handler method 102) on the call stack 300. Using the configuration file 212, the process 400 may determine 408 whether the method is an intermediate method 106. If so, the process 400 may then analyze 410 the next method on the call stack 300. If, on the other hand, the encountered method is not an intermediate method 106, the process 400 may determine that a requester method 100 has been reached. The process 400 may then determine 412 whether the requester method 100 is listed in the configuration file 212. If the requester method 100 is listed in the configuration file 212, the process 400 may return 414 the simulated system time to the calling method. If, on the other hand, the requester method 100 is not listed in the configuration file 212, the process 400 may return 416 the real system time to the calling method.

It should be noted that although particular reference is made herein to the Java programming environment, apparatus and processes in accordance with the invention are not necessarily limited to the Java programming environment. Thus, the Java programming environment is provided only by way of example. Indeed, the apparatus and processes disclosed herein may be applicable to other programming environments, regardless of whether they have the same names, rules, and/or syntax described herein, or to programming environments or situations where a similar problem exists.

The flowchart and block diagrams in the Figures illustrate the architecture, functionality, and operation of possible implementations of systems, processes, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. An apparatus for providing a simulated date and/or time to a time-sensitive application, the apparatus comprising:
   a detection module to detect an invocation of a time handler method, the time handler method configured to retrieve the system time of a computing system;
   a capture module to capture the contents of a call stack once the invocation is detected;
   a stack walk module to walk the call stack until reaching a requestor method that initiated the invocation;
   a stack analysis module to analyze the contents of the call stack to determine which requestor method initiated the invocation;
   the stack analysis module further configured to determine whether the requestor method that initiated the invocation is to receive one of a real system time and a simulated system time;
   a return module configured to return a real system time in the event the requestor method is to receive the real system time; and
   the return module further configured to return a simulated system time in the event the requestor method is to receive the simulated system time.

2. The apparatus of claim 1, wherein the stack analysis module is further configured to ignore intermediate methods that did not initiate the invocation.

3. The apparatus of claim 1, wherein the stack analysis module is further configured to reference a configuration file listing requestor methods that are to receive a simulated time.

4. The apparatus of claim 1, further comprising a call module to call an operating system service that returns the real system time.

5. The apparatus of claim 1, further comprising a call module to call a time/date simulation application that returns the simulated system time.

6. The apparatus of claim 1, wherein the requestor method is a java requestor method.

7. A computer program product for providing a simulated date and/or time to a time-sensitive application, the computer program product comprising a computer-readable storage medium having computer-usable program code embodied therein, the computer-usable program code comprising:
   computer-usable program code to detect an invocation of a time handler method, the time handler method configured to retrieve the system time of a computing system;
   computer-usable program code to capture the contents of a call stack upon detecting the invocation;
   computer-usable program code to walk the call stack until reaching a requestor method that initiated the invocation;
   computer-usable program code to analyze the contents of the call stack to determine which requestor method initiated the invocation;
   computer-usable program code to determine whether the requestor method that initiated the invocation is to receive one of a real system time and a simulated system time;
   computer-usable program code to return a real system time in the event the requestor method is to receive the real system time; and
   computer-usable program code to return a simulated system time in the event the requestor method is to receive the simulated system time.

8. The computer program product of claim 7, further comprising computer-usable program code to ignore intermediate methods that did not initiate the invocation.

9. The computer program product of claim 7, further comprising computer-usable program code to read a configuration file listing requestor methods that are to receive a simulated time.

10. The computer program product of claim 7, further comprising computer-usable program code to call an operating system service that returns the real system time.

11. The computer program product of claim 7, further comprising computer-usable program code to call a time/date simulation application that returns the simulated system time.

* * * * *